(12) United States Patent
Fakeris et al.

(10) Patent No.: US 9,815,252 B2
(45) Date of Patent: Nov. 14, 2017

(54) WET CYCLONE DUST FILTRATION SYSTEM

(71) Applicant: Ohio Blow Pipe Co., Cleveland, OH (US)

(72) Inventors: Ed Fakeris, Cleveland, OH (US); John DeLong, Paramount, CA (US)

(73) Assignee: Ohio Blow Pipe Co., Cleveland, OH (US)

( * ) Notice: Subject to any disclaimer, the term of this patent is extended or adjusted under 35 U.S.C. 154(b) by 210 days.

(21) Appl. No.: 14/434,603

(22) PCT Filed: Oct. 7, 2013

(86) PCT No.: PCT/US2013/063671
§ 371 (c)(1),
(2) Date: Apr. 9, 2015

(87) PCT Pub. No.: WO2014/058773
PCT Pub. Date: Apr. 17, 2014

(65) Prior Publication Data
US 2015/0283780 A1    Oct. 8, 2015

Related U.S. Application Data

(60) Provisional application No. 61/711,667, filed on Oct. 9, 2012.

(51) Int. Cl.
*B01D 47/00* (2006.01)
*B31B 1/74* (2006.01)
(Continued)

(52) U.S. Cl.
CPC ............... *B31B 1/74* (2013.01); *B01D 47/06* (2013.01); *B01D 50/004* (2013.01); *B04C 9/00* (2013.01);
(Continued)

(58) Field of Classification Search
CPC .................... B01D 47/00; B01D 47/06
(Continued)

(56) References Cited

U.S. PATENT DOCUMENTS 6,394,371 B1 * 5/2002 Ribardi ............... B02C 19/005
241/16

FOREIGN PATENT DOCUMENTS

EP    1 317 971 A2    6/2003
EP    1 958 699 A1    8/2008
(Continued)

OTHER PUBLICATIONS

International Search Report for corresponding patent application No. PCT/US2013/063671 dated Jan. 27, 2014.
(Continued)

*Primary Examiner* — Robert A Hopkins
(74) *Attorney, Agent, or Firm* — Renner, Otto, Boisselle & Sklar, LLP (57) ABSTRACT

Provided is a cardboard conversion line including a wet cyclone dust collector for removing dust laden air from the conversion line. The wet cyclone dust collector has a swirl chamber in which air containing particles swirls in a rotational direction and a plurality of circumferentially spaced nozzles located within the swirl chamber to direct a spray of fluid within the swirl chamber in the rotational direction to wet the air containing particles, and the wetted particles are separated from the air in the swirl chamber. In this way, a system may be provided to clean high volumes of air containing particles without having to provide an explosion vent and without having to provide additional fans, motors, and compressed air.

20 Claims, 8 Drawing Sheets

(51) Int. Cl.
*B01D 47/06* (2006.01)
*B31F 1/28* (2006.01)
*B01D 50/00* (2006.01)
B04C 9/00 (2006.01)
B01D 45/12 (2006.01)

(52) U.S. Cl.
CPC ............ *B31F 1/2845* (2013.01); *B01D 45/12* (2013.01); *B04C 2009/008* (2013.01); *B31B 2201/95* (2013.01)

(58) Field of Classification Search
USPC ..... 55/424, 426; 96/301, 314, 319, 320, 321
See application file for complete search history.

(56) References Cited

FOREIGN PATENT DOCUMENTS

| | | | | |
|---|---|---|---|---|
| JP | 60038028 A | * | 2/1985 | ............ B01F 5/0057 |
| JP | 62001430 A | * | 1/1987 | |
| JP | 2009 000631 A | | 1/2009 | |

OTHER PUBLICATIONS

International Preliminary Report on Patentability for corresponding patent application No. PCT/US2013/063671 dated Apr. 14, 2015.

* cited by examiner

WET CYCLONE DUST FILTRATION SYSTEM

RELATED APPLICATIONS

This application is a national phase of International Application No. PCT/US2013/063671 filed Oct. 7, 2013 and published in the English language, which claims priority to U.S. Provisional Application No. 61/711,667 filed Oct. 9, 2012.

FIELD OF INVENTION

The present invention relates generally to cardboard conversion lines, and more particularly to wet cyclone dust filtration systems for cardboard conversion lines.

BACKGROUND

Cardboard conversion lines having vacuum transfer systems, for example for producing corrugated cardboard boxes, produce a high volume of dust laden air at the various stages of the conversion line. The exhaust of the vacuum transfer system causes the dust laden air to be discharged into the workplace, which causes air quality and explosion concerns. To collect the dust laden air, dust collectors, such as cartridge dust bags having explosion venting requirements can be used. In cardboard conversion lines with a high rate of air flow, an operator must changes the cartridge dust bags often to prevent damage to the cardboard conversion lines.

SUMMARY OF INVENTION

The present invention provides a cardboard conversion line including a wet cyclone dust collector having a swirl chamber in which air containing particles swirls in a rotational direction and a plurality of circumferentially spaced nozzles located within the swirl chamber to direct a spray of fluid within the swirl chamber in the rotational direction to wet the air containing particles, and the wetted particles are separated from the air in the swirl chamber. In this way, a system may be provided to clean high volumes of air containing particles without having to provide an explosion vent and without having to provide additional fans, motors, and compressed air.

According to one aspect of the invention, a cardboard conversion line is provided that includes an entry end for receiving cardboard to be subsequently processed as it passes through one or more processing stations within the conversion line, at least one collection zone through which the cardboard passes, a wet cyclone dust collector, and a blower having an inlet connected to the at least one collection zone and an outlet connected to an inlet of the wet cyclone dust collector, wherein the wet cyclone dust collector includes a swirl chamber defined by an inner circumferential wall and an outer circumferential wall radially spaced from the inner wall, the swirl chamber including an inlet tangential to the inner and outer circumferential walls for directing air containing particulates into the swirl chamber causing the air to swirl in a first rotational direction, and an outlet at a bottom of the swirl chamber, and a plurality of circumferentially spaced nozzles located within the swirl chamber to direct a spray of fluid within the swirl chamber in the first rotational direction, the plurality of circumferentially spaced nozzles including at least one nozzle in each quadrant of the swirl chamber.

The plurality of circumferentially spaced nozzles are spaced apart such that the spray exiting each of the nozzles intersects the nozzle downstream of the respective nozzle.

According to another aspect of the invention, a wet cyclone dust collector is provided that includes a swirl chamber defined by an inner circumferential wall and an outer circumferential wall radially spaced from the inner wall, the swirl chamber including an inlet tangential to the inner and outer circumferential walls for directing air containing particulates into the swirl chamber causing the air to swirl in a first rotational direction, and an outlet at a bottom of the swirl chamber, and a plurality of circumferentially spaced nozzles located within the swirl chamber to direct a spray of fluid within the swirl chamber in the first rotational direction, the plurality of circumferentially spaced nozzles including at least one nozzle in each quadrant of the swirl chamber.

The plurality of circumferentially spaced nozzles are spaced apart such that the spray exiting each of the nozzles intersects the nozzle downstream of the respective nozzle.

The plurality of circumferentially spaced nozzles collectively generate a spray of fluid that impinges on an inner surface of the outer circumferential wall over at least 70% of the inner surface to remove particulates from the inner surface.

The plurality of circumferentially spaced nozzles collectively generate a spray of fluid that impinges on an inner surface of the outer circumferential wall over at least 80% of the inner surface to remove particulates from the inner surface.

The plurality of circumferentially spaced nozzles collectively generate a spray of fluid that impinges on an inner surface of the outer circumferential wall over at least 90% of the inner surface to remove particulates from the inner surface.

The plurality of circumferentially spaced nozzles collectively generate a spray of fluid that impinges on an inner surface of the outer circumferential wall over the entire inner surface to remove particulates from the inner surface.

The wet cyclone dust collector further includes an inlet portion connected to the inlet of the swirl chamber, the inlet portion having at least one nozzle within the inlet portion to direct a spray of fluid in the first rotational direction.

The wet cyclone dust collector further includes a conical bottom chamber having an inlet adjacent the outlet of the swirl chamber for receiving the swirling fluid and particulates and an outlet.

The wet cyclone dust collector further includes a collection tank downstream of the conical bottom chamber, wherein the fluid and particulates are delivered to the collection tank where the fluid and particulates are at least partially separated.

According to still another aspect of the invention, a wet cyclone dust collector is provided that includes a swirl chamber defined by an inner circumferential wall and an outer circumferential wall radially spaced from the inner wall, the swirl chamber including a central axis, an inlet tangential to the inner and outer circumferential walls for receiving particulates, and an outlet at a bottom of the swirl chamber, a plurality of circumferentially spaced nozzles having an axis and being located within the swirl chamber to direct a spray of fluid within the swirl chamber, wherein the axis of each nozzle is oriented fifteen degrees relative to a plane parallel to and intersecting the axis of the swirl chamber.

The spray of fluid from each nozzle is at a seventy degree spray angle from an outlet of each nozzle.

The spray of fluid is a cone spray of fluid.

The swirl chamber includes a top circumferential wall interposed between the inner and outer walls.

The top wall includes a plurality of circumferentially spaced openings through which respective fluid conduits connected to the nozzles extends.

According to a further aspect of the invention, a wet cyclone dust collector is provided that includes a swirl chamber defined by an inner circumferential wall and an outer circumferential wall radially spaced from the inner wall, the swirl chamber including an inlet tangential to the inner and outer circumferential walls, and an outlet at a bottom of the swirl chamber, a plurality of nozzles located within the swirl chamber to direct a spray of fluid within the swirl chamber, a bottom chamber disposed beneath the swirl chamber and having an inlet adjacent the outlet of the swirl chamber for receiving swirling fluid and particulates from the swirl chamber, and a baffle interposed between the swirl chamber and the bottom chamber, the baffle at least spanning a bottom of the inlet to prevent fluid and particulates received at the inlet from exiting the swirl chamber prior to being wetted by the nozzles.

The baffle extends beyond the bottom of the inlet to a point at least ninety degrees from the inlet.

The baffle extends beyond the bottom of the inlet to a point at least one hundred fifty-five degrees from the inlet.

The baffle is downwardly angled from the inner circumferential wall to the outer circumferential wall to allow fluid and particulates to flow towards the outer circumferential wall.

A gap is provided between the outer circumferential wall and the baffle to allow the fluid and particulates to flow to the outlet.

According to another aspect of the invention a method of wetting dust collected from a cardboard conversion line using a wet cyclone dust collector including a swirl chamber defined by an inner circumferential wall and an outer circumferential wall radially spaced from the inner wall, and a plurality of nozzles located within the swirl chamber, wherein the plurality of nozzles intersect such that a spray of fluid directed from the nozzles impinges on an interior surface of the outer circumferential wall over at least 70% of the inner surface to remove particulates from the inner surface.

According to a further aspect of the invention, a system for collecting particles, in particular paper particles in an air stream is provided. The system includes a conversion line having an entry portion for receiving material to be subsequently processed as it passes through one or more processing stations within the conversion line, and at least one collection zone through which the material passes, a cyclone particulate collector, and a blower having an inlet connected to the at least one collection zone and an outlet connected to an inlet of the cyclone particulate collector, wherein the cyclone particulate collector includes a swirl chamber including an inlet for directing air containing particulates into the swirl chamber causing the air to swirl in a first rotational direction, and an outlet at a bottom of the swirl chamber, and a plurality of circumferentially spaced nozzles located within the swirl chamber to direct a spray of fluid within the swirl chamber in the first rotational direction.

The swirl chamber is defined by an inner circumferential wall and an outer circumferential wall radially spaced from the inner wall, and wherein the inlet is tangential to the inner and outer circumferential walls.

The plurality of circumferentially spaced nozzles include at least one nozzle in each quadrant of the swirl chamber.

The foregoing and other features of the invention are hereinafter described in greater detail with reference to the accompanying drawings.

DETAILED DESCRIPTION

The principles of the present application have particular application to the collection of cardboard dust in cardboard conversion lines, and thus will be described below chiefly in this context. It will of course be appreciated, and also understood, that the principles of the invention may be useful in other systems where it is desirable to collect particulates.

Figure 1:
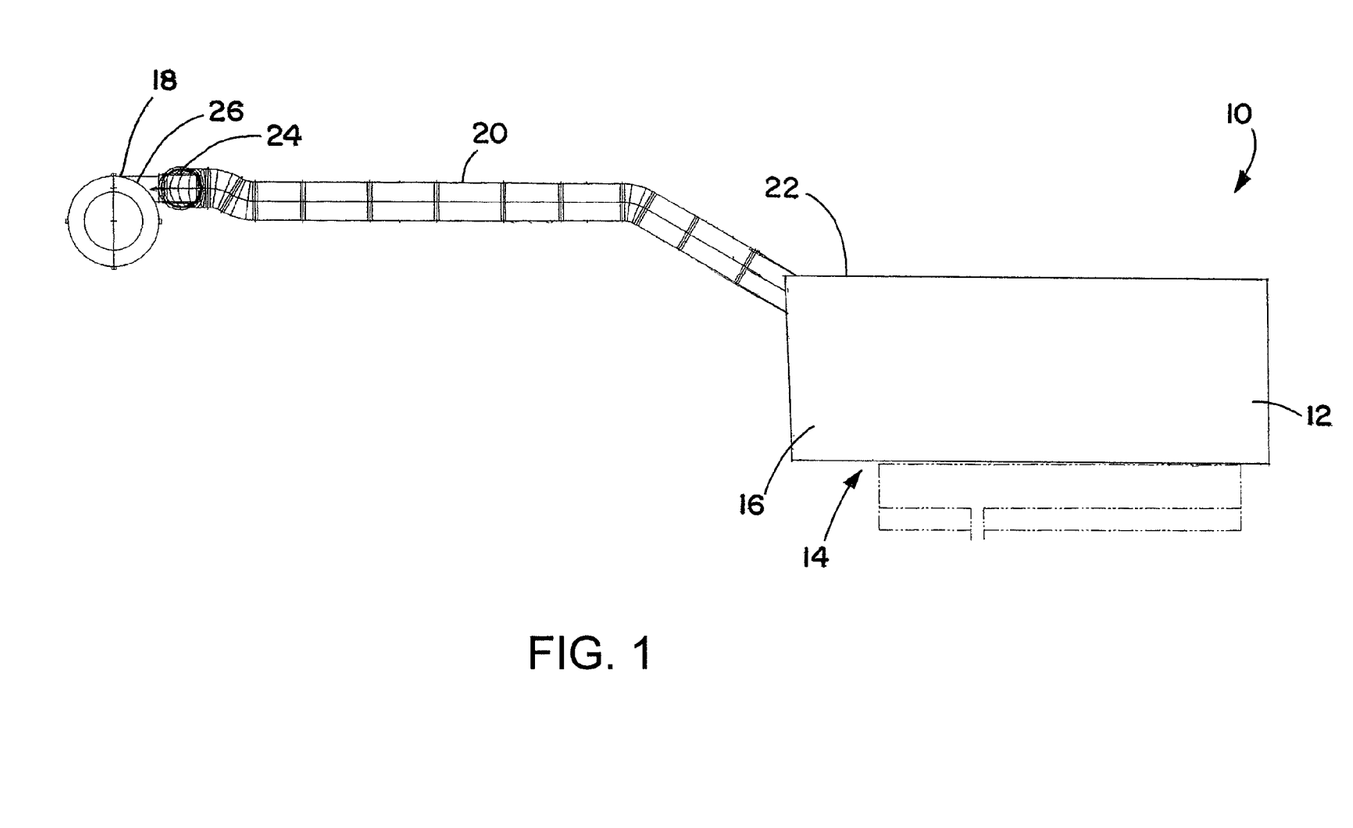
FIG. 1 is a side view of an exemplary cardboard conversion line including a wet cyclone dust collector according to the invention.

Turning now to FIG. 1, a cardboard conversion line is illustrated generally at reference numeral 10. The cardboard conversion line, which may be provided for producing corrugated boxes, uses a vacuum transfer system for transferring cardboard through the line. The cardboard conversion line 10 includes an entry end 12 for receiving cardboard to be subsequently processed as it passes through one or more processing stations 14 within the conversion line 10, at least one collection zone 16 through which the cardboard passes, a wet cyclone dust collector 18, and a blower 20 having an inlet 22 connected to the at least one collection zone 16 and an outlet 24 connected to an inlet 26 of the wet cyclone dust collector 18. It will be appreciated that the processing stations 14 for processing the cardboard may be conventional and thus will not be discussed in detail.

Figure 2:
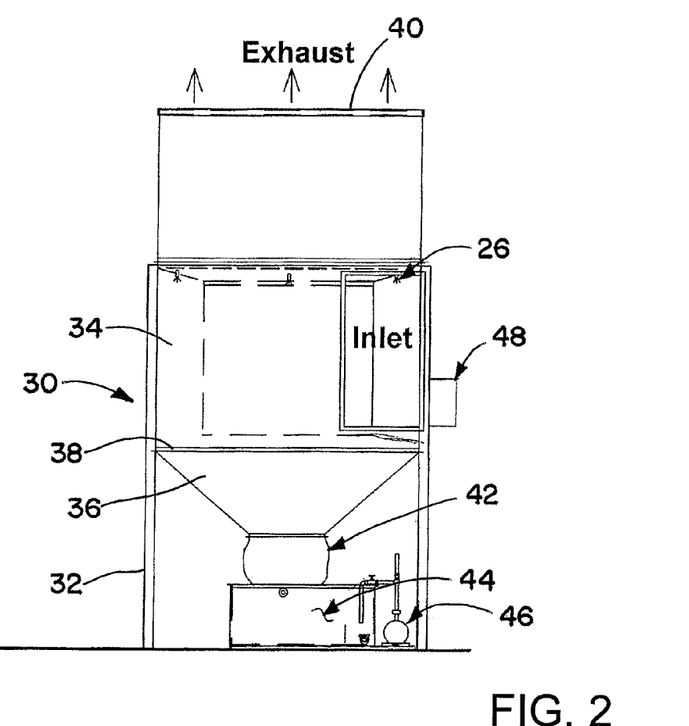
FIG. 2 is a front view of the exemplary wet cyclone dust collector according to the invention.
Figure 3:
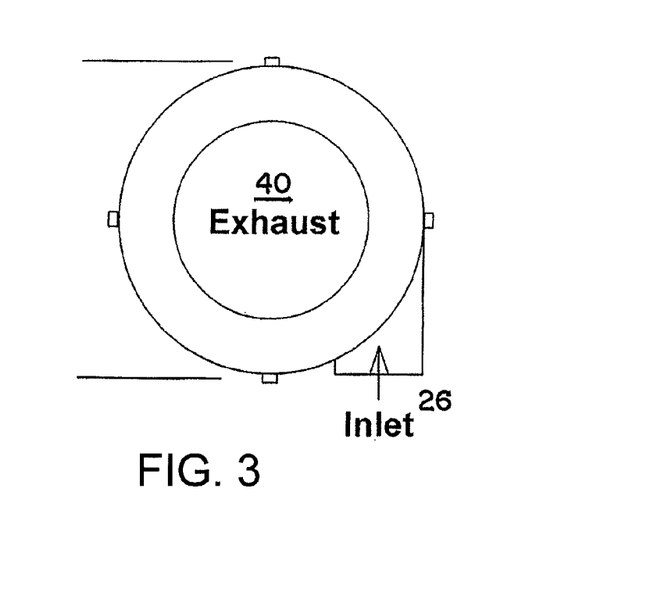
FIG. 3 is a top view of the wet cyclone dust collector.

Turning now to FIGS. 2 and 3, the exemplary wet cyclone dust collector 18 is provided to receive high volumes of particulate laden air, such as 30,000 cubic feet per minute of corrugated box dust laden air, and to wet the particulate laden air, thereby preventing the particulates from creating an unsafe working environment. The wet cyclone dust collector 18 includes a housing 30 that may be supported on the floor by suitable supports 32, such as vertical legs. The housing 30 includes a swirl chamber or cyclone chamber 34 at an upper region, a conical bottom chamber 36 disposed beneath and communicating with the swirl chamber 34, the inlet 26, an outlet 38 at a bottom portion of the swirl chamber, and an exhaust outlet 40 for exhausting air above the swirl chamber 34. In an embodiment, a filter 42 may be provided below the conical bottom chamber 36 for filtering the particulates from fluid, which is collected in a tank 44 and recirculated through the dust collector 18 via a pump 46. A suitable control panel 48 may be provided to allow the dust collector 18 to be controlled.

Figure 4:
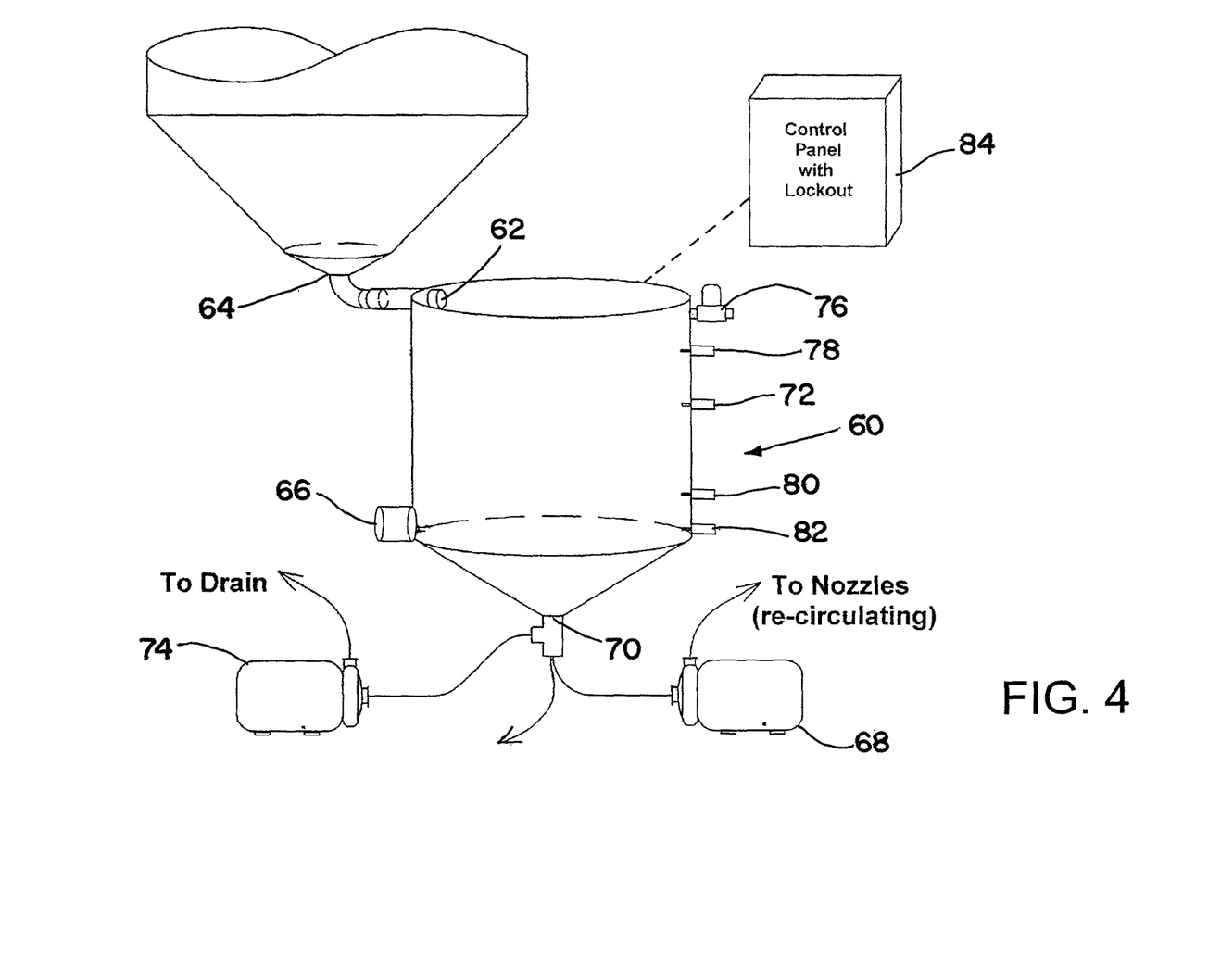
FIG. 4 is a front view of a collection tank of the wet cyclone dust collector.

As shown in FIG. 4, a collection tank 60 may be provided downstream of the conical bottom chamber 36 in place of the filter and water tank. Fluid and particulates are delivered to an inlet 62 of the collection tank 60 from an outlet 64 of the bottom chamber 36. As the fluid and particulates move down the collection tank 60, the particulates are at least partially separated from the fluid, and the substantially clean fluid exits the collection tank 60 via a first outlet 66, shown at a side portion of the collection tank, and is delivered to the swirl chamber 34 by a suitable pump, such as pump 68. The remaining fluid and particulates exit the collection tank 60 via a second outlet 70 connected to a suitable filtration system for filtering the particulates from the fluid and delivering the filtered fluid to the swirl chamber 34 and/or to a drain. The dry particulates filtered from the fluid may then be disposed. In this way, bag filters, which if not properly serviced result in equipment downtime and which require frequent maintenance may be avoided while allowing for high volumes of fluid containing particulates to be properly and economically processed.

The collection tank 60 may normally hold fluid, for example so that the fluid level is above a fill level switch 72. During start up of the wet cyclone dust collector 18, a pump, such as pump 74 is started and run to flush the collection tank 60. After the collection tank 60 has been flushed, the pump 72 is stopped, the pump 68 is started, and a fill valve 76, which may be any suitable valve such as a solenoid valve, is opened. In addition to the fill level switch 72, the collection tank 60 may include other suitable switches, such as a high level switch 78 for closing the valve, a low level switch 80, and an alarm level switch 82.

To perform a clean cycle for the collection tank 60, a timer may be provided that starts the pump 74 while the pump 68 is running. The fill valve 76 is then closed and the high and fill switches 78 and 72 are not operational. Once the fluid is drained to the level of the low level switch 80, the low level switch deactivates the pump 74 and opens the valve 76, thereby causing the high and fill level switches to be operational. The alarm level switch 82 may be provided to set off an alarm on an operation panel 84 to shut down the system if the water level is too low. The operation panel 84 may include a manual clean cycle button to start the cleaning process.

Figure 5:
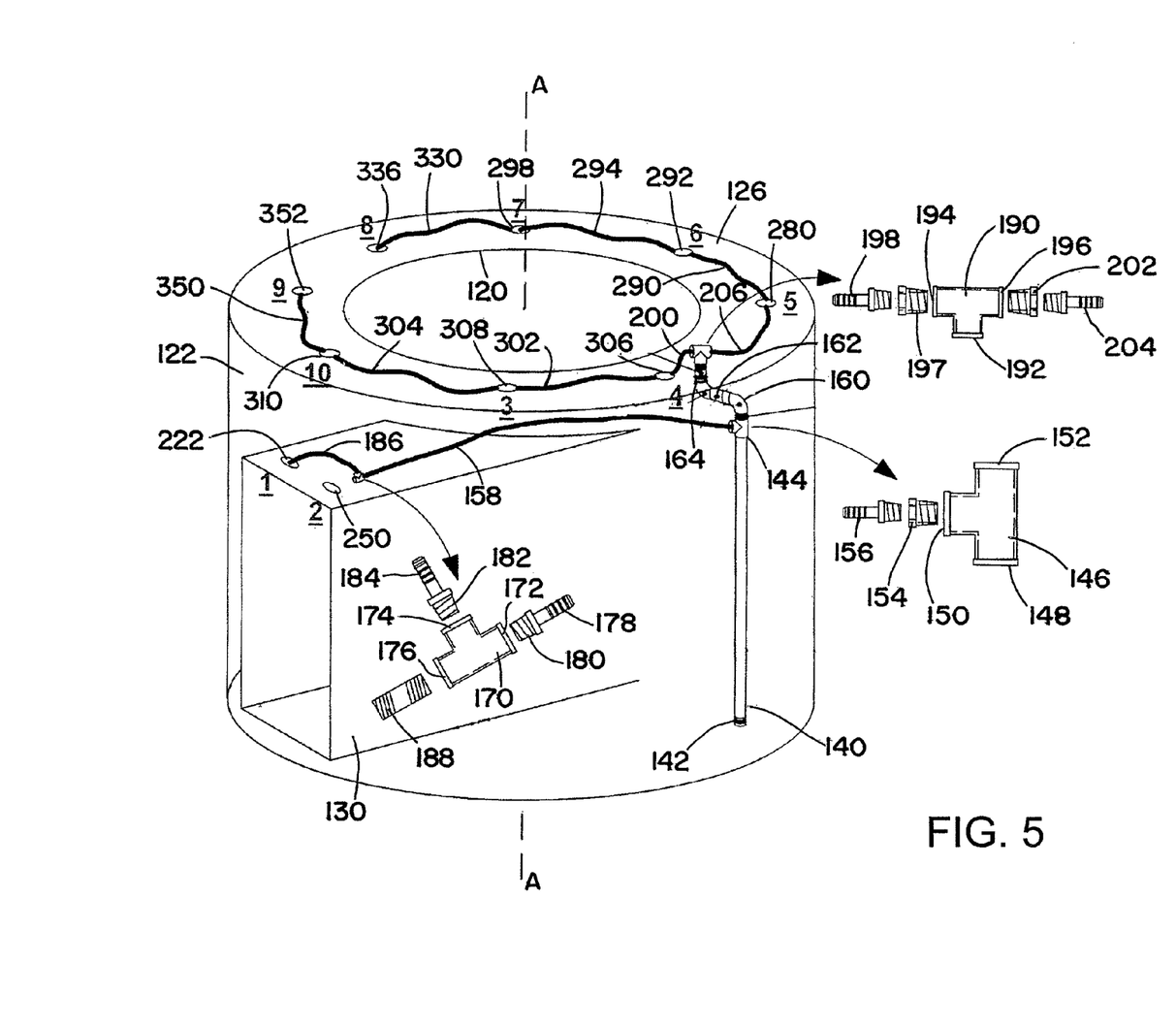
FIG. 5 is perspective view of a swirl chamber of the wet cyclone dust collector.
Figure 6:
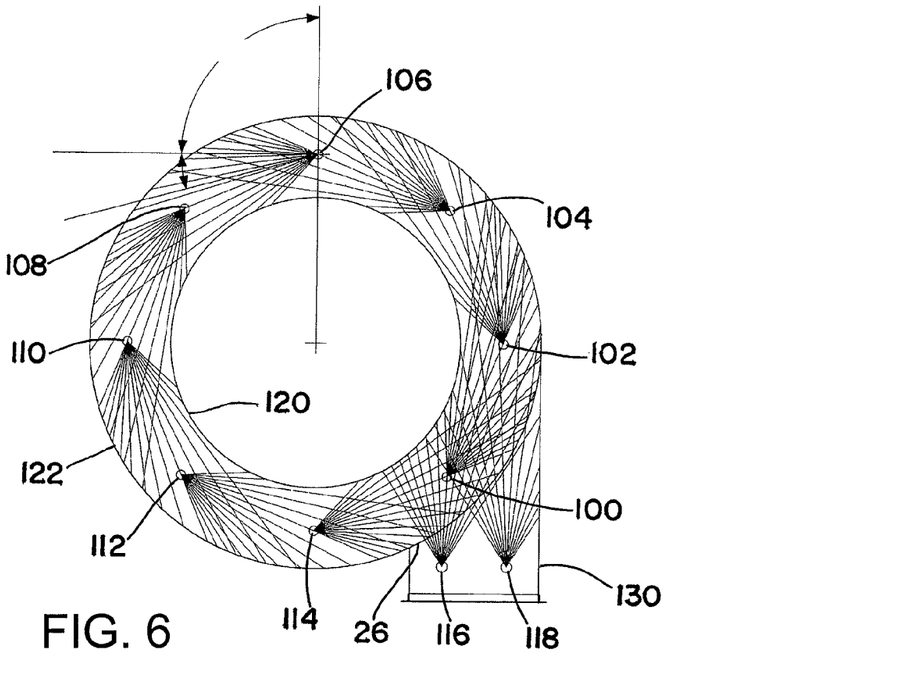
FIG. 6 is a top view of the swirl chamber illustrating a flow pattern of fluid out of a plurality of nozzles.
Figure 7:
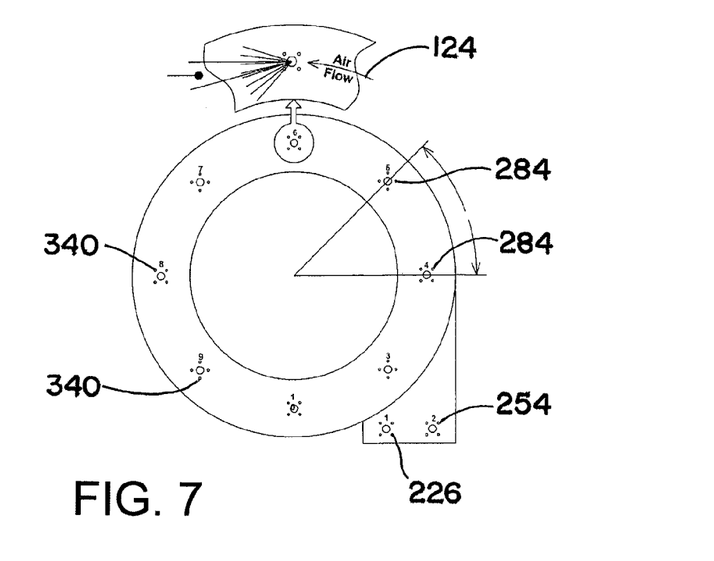
FIG. 7 is another top view of the swirl chamber.

Turning now to FIGS. 5-12, and initially to FIGS. 5-7, the wet cyclone dust collector 18 will be discussed in detail. As noted above, the wet cyclone dust collector 18 includes the swirl chamber 34, which may be any suitable material such as stainless steel, and a plurality of nozzles 100, 102, 104, 106, 108, 110, 112, 114, 116, and 118. The swirl chamber 34 is defined by an inner circumferential wall 120 and an outer circumferential wall 122 radially spaced from the inner wall 120. The swirl chamber 34 includes the inlet 26 tangential to the inner and outer circumferential walls 120 and 122 for directing air containing particulates into the swirl chamber 34, thereby causing the air to swirl in a first rotational direction 124, the outlet 38 at the bottom of the swirl chamber 34, and a top circumferential wall 126 interposed between the inner circumferential wall 120 and the outer circumferential wall 122. The top circumferential wall 126 includes a plurality of openings through which fluid conduits connected to the nozzles 100-114 extend as will be discussed in detail below.

The plurality of nozzles 100-114 are circumferentially spaced and located within the swirl chamber 34, and may be any suitable nozzles for directing a spray of fluid within the swirl chamber 34 in the first rotational direction 124. At least one nozzle is provided in each quadrant of the swirl chamber 34, and in the illustrated embodiment, multiple nozzles are provided in each quadrant. As shown in FIG. 6, the plurality of circumferentially spaced nozzles 100-114 may be spaced apart such that the spray exiting each of the nozzles intersects the nozzle downstream of said nozzle. The nozzles may be spaced apart, for example, 45 degrees from one another.

Figure 9:
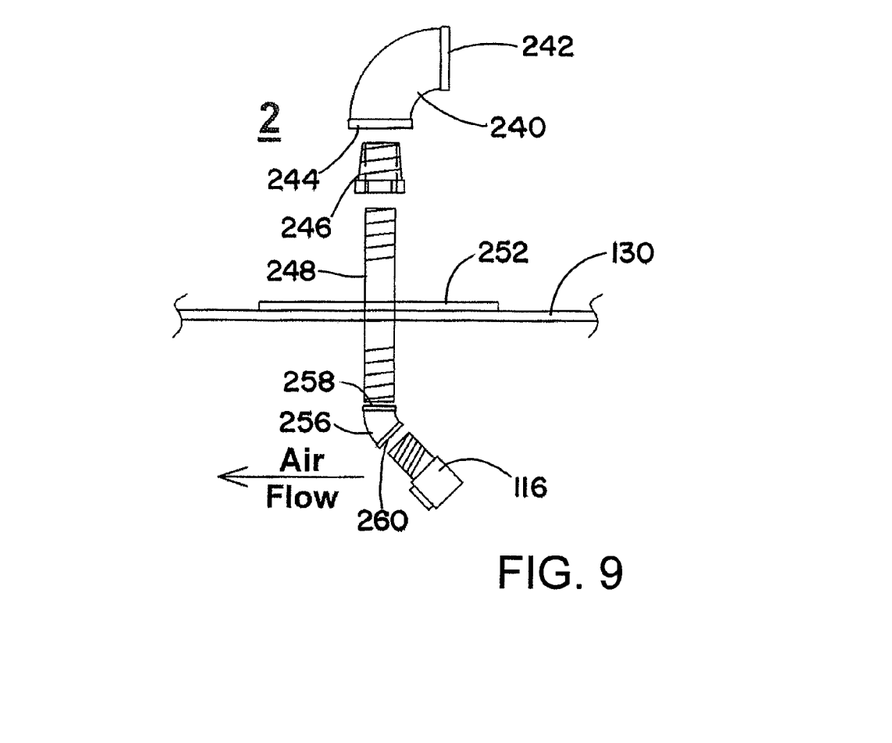
FIG. 9 is a side view of another exemplary nozzle for an inlet portion connected to the swirl chamber and a fitting assembly for coupling the nozzle to a fluid source.

The nozzles 100-114 collectively generate a spray of fluid that impinges on an inner surface of the outer circumferential wall 122 over at least 70% of the inner surface to remove particulates from the inner surface. In an embodiment, the nozzles generate a spray that impinges on the inner surface of the outer circumferential wall 122 over at least 80% of the inner surface. In another embodiment, the nozzles generate a spray that impinges on the inner surface of the outer circumferential wall 122 over at least 90% of the inner surface. In still another embodiment, the nozzles generate a spray that impinges on the inner surface of the outer circumferential wall 122 over the entire inner surface. As shown in FIG. 9, the plurality of circumferentially spaced nozzles 100-114 each have an axis oriented fifteen degrees relative to a plane parallel to and intersecting an axis A-A of the swirl chamber 34. In this orientation, the nozzles 100-114 direct a spray of fluid at a seventy degree spray angle, for example as a cone spray that forms a water curtain to saturate the particulates.

The nozzles 116 and 118 are provided within an inlet portion 130 of the housing 30 connected to the inlet 26 of the swirl chamber 34, and may be any suitable nozzle for directing a spray of fluid in the first rotational direction 124 as shown in FIG. 6. The nozzles 116 and 118 may be oriented in a side by side orientation such that the spray exiting the nozzles 116 and 118 overlaps the spray exiting the nozzles 100 and 114. It will be appreciated that the inlet portion may only include any suitable number of nozzles for wetting the particulate laden air as it enters the swirl chamber 34.

Referring again to FIG. 5, fluid is supplied to the nozzles 100-118 via a conduit 140 extending axially along the outside or inside of the swirl chamber 34. A first end 142 of the conduit 140 is configured for connection to a fluid source and the collection tank 60, and a second end 144 is connected to a fitting 146 at port 148, such as a tee-fitting having ports 148, 150 and 152. Connected to port 150 of the tee-fitting 146 may be a bushing 154, which receives a nipple 156 that couples to a fluid conduit 158. Connected to port 152 of the fitting 146 is a fitting 160, which may be a ninety degree fitting, which is coupled to a nipple 162, which is coupled to a fitting 164, which may be a ninety degree fitting.

The fluid conduit 158 is coupled to a fitting 170 at port 172, such as a tee-fitting having ports 172, 174 and 176, via a nipple 178 coupled to a bushing 180. Connected to port 174 of the fitting 170 may be a bushing 182, which receives a nipple 184 that couples to a fluid conduit 186 connected to the nozzle 116. Connected to port 176 of the fitting 170 is a nipple 188 connected to the nozzle 118.

The fitting 164 is coupled to a fitting 190 at port 192, such as a tee-fitting having ports 192, 194 and 196. Connected to port 194 may be a bushing 197, which receives a nipple 198 that couples to a fluid conduit 200 connected to nozzle 102. Connected to port 196 may be a bushing 202, which receives a nipple 204 that couples to a fluid conduit 206 connected to nozzle 104.

Figure 8:
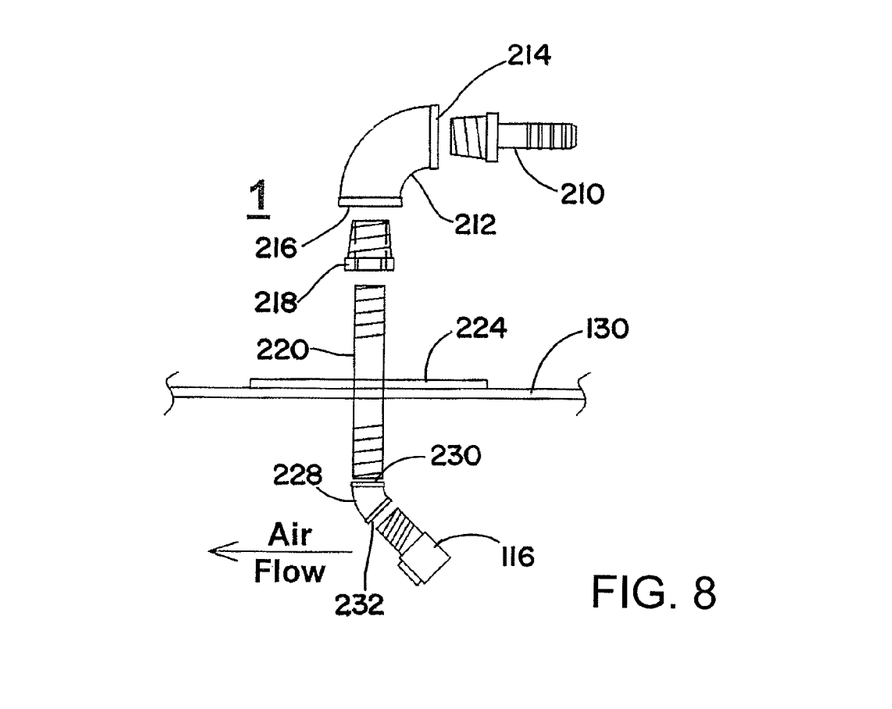
FIG. 8 is a side view of an exemplary nozzle for an inlet portion connected to the swirl chamber and a fitting assembly for coupling the nozzle to a fluid source.

Referring now to FIG. 8 in combination with FIG. 5, the nozzle 116 may be coupled to the fluid conduit 186 in any suitable manner. For example, the fluid conduit 186 may be coupled to a nipple 210, which may be sized to couple to a port 214 of fitting 212 or which may be coupled to a bushing that couples to the fitting 212. The fitting 212 may be any suitable fitting, such as a ninety degree fitting, that has a port 216 that couples to a bushing 218, which receives a nipple 220 that extends through an opening 222 at the top of the inlet portion 130. The nipple 220 may extend through and be secured to a plate 224, such as by welding, and the plate may be secured to the top of the inlet portion 130 in any suitable manner, such as by fasteners received in openings 226 (FIG. 7). The end of the nipple 220 that extends through the opening 222 is coupled to a fitting 228, such as a forty-five degree fitting, at port 230 of the fitting, and port 232 of the fitting is coupled to the nozzle 116.

Referring now to FIG. 9 in combination with FIG. 5, the nozzle 118 may be coupled to the fitting 170 in any suitable manner. For example, a fitting 240, such as a ninety degree fitting having ports 242 and 244, may be coupled at port 242 to the nipple 188 that is coupled to port 176 in the fitting 170. Coupled to port 244 is a bushing 246, which receives a nipple 248 that extends through an opening 250 at the top of the inlet portion 130. The nipple 248 may extend through and be secured to a plate 252, such as by welding, and the plate may be secured to the top of the inlet portion 130 in any suitable manner, such as by fasteners received in openings 254 (FIG. 7). The end of the nipple 248 that extends through the opening 250 is coupled to a fitting 256, such as a forty-five degree fitting, at port 258 of the fitting, and port 260 of the fitting 256 is coupled to the nozzle 118.

Figure 10:
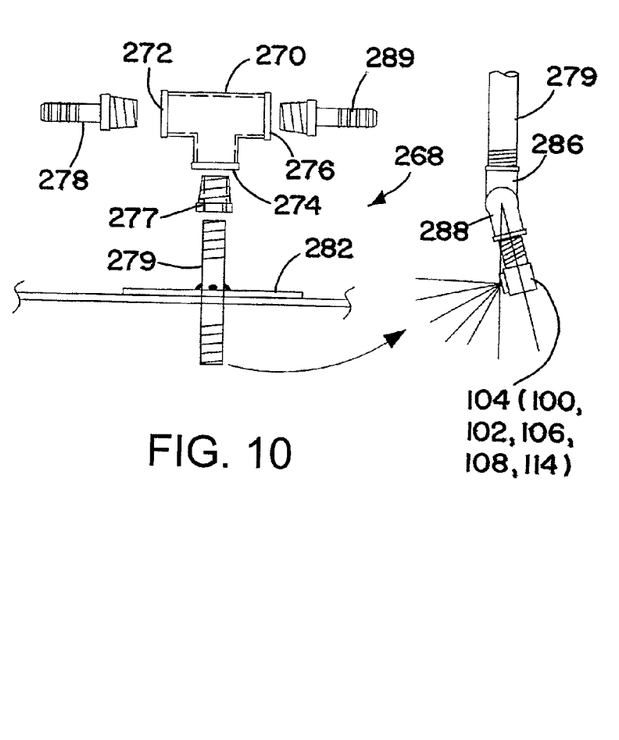
FIG. 10 is a side view of an exemplary nozzle within the swirl chamber and a fitting assembly for coupling the nozzle to a fluid source.

Referring now to FIG. 10 in combination with FIG. 5, a fitting assembly 268 for connecting the nozzles 100, 102, 104, 106, 108 and 114 to a fluid source is shown. The nozzles may be coupled to the fitting assembly in any suitable manner. For example, the fitting assembly 268 may include a fitting 270 having ports 272, 274, and 276, and may be coupled to a nipple 278 at port 272, which nipple is coupled to the fluid conduit 206. Coupled to the port 274 is a bushing 277, which receives a nipple 279 that extends through an opening 280 in the top circumferential wall 126. The nipple 279 may extend through and be secured to a plate 282, such as by welding, and the plate may be secured to the top circumferential wall 126 in any suitable manner, such as by fasteners received in openings 284 (FIG. 7). The end of the nipple 279 that extends through the opening 280 is coupled to a fitting 286, such as a ninety degree fitting, and the fitting 286 is coupled to a fitting 288, such as a street elbow, which is coupled to the nozzle 104.

Coupled to the port 276 is a nipple 289, which is coupled to a fluid conduit 290, which is coupled to another fitting assembly 268 in the manner discussed above. The fitting assembly has a nipple 279 extending through an opening 292, the nipple 279 being coupled to a fitting 286, which is coupled to fitting 288, which is coupled to the nozzle 106. In a similar manner, fluid conduit 294 is coupled to port 276 of the upstream fitting 270, and the fitting assembly 268 coupled to the fluid conduit 294 has a nipple extending through opening 298, which nipple is coupled to the fitting coupled to the nozzle 108. In a similar manner, the fluid conduit 200 and fluid conduits 302 and 304 are coupled to ports 276 of upstream fittings 270, and the respective fitting assemblies 268 coupled to the fluid conduits 200, 302 and 304 have nipples extending through openings 306, 308 and 310, respectively, which nipples are coupled to fittings coupled to the respective nozzles 102, 100 and 114. Accordingly, the fitting assembly 268 shown in FIG. 10 may be used with nozzles 100, 102, 104, 106, 108 and 114, although it will be appreciated that any suitable fitting assembly may be used to connect the nozzles to a fluid source.

Figure 11:
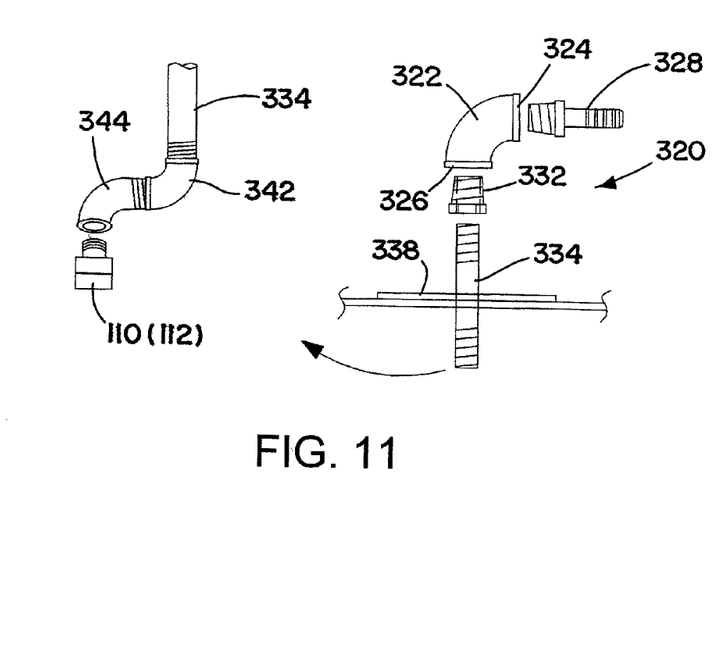
FIG. 11 is a side view of another exemplary nozzle within the swirl chamber and a fitting assembly for coupling the nozzle to a fluid source.

Referring now to FIG. 11 in combination with FIG. 5, a fitting assembly 320 for connecting the nozzles 110 and 112 to a fluid source is shown. The nozzles may be coupled to the fitting assembly in any suitable manner. For example, the fitting assembly 320 may include a fitting 322 having ports 324 and 326, and may be coupled to a nipple 328 at port 324, which nipple is coupled to a fluid conduit 330 coupled to the fitting assembly for nozzle 110. Coupled to the port 326 is a bushing 332, which receives a nipple 334 that extends through an opening 336 in the top circumferential wall 126. The nipple 334 may extend through and be secured to a plate 338, such as by welding, and the plate may be secured to the top circumferential wall 126 in any suitable manner, such as by fasteners received in openings 340 (FIG. 7). The end of the nipple 334 that extends through the opening 336 is coupled to a fitting 342, such as a ninety degree fitting, and the fitting 342 is coupled to a fitting 344, such as a street elbow, which is coupled to the nozzle 110. Similarly, a fluid conduit 350 is coupled to the fitting assembly for nozzle 114 and coupled to another fitting assembly 320 in the manner discussed above. The fitting assembly has a nipple 334 extending through an opening 352, the nipple 334 being coupled to a fitting 342, which is coupled to fitting 344, which is coupled to the nozzle 112. It will be appreciated that the above-described bushings may be eliminated and the nipples sized to mate directly with the ports. It will also be appreciated that the above-described nipples may mate with bushings to couple to the ports.

Figure 12:
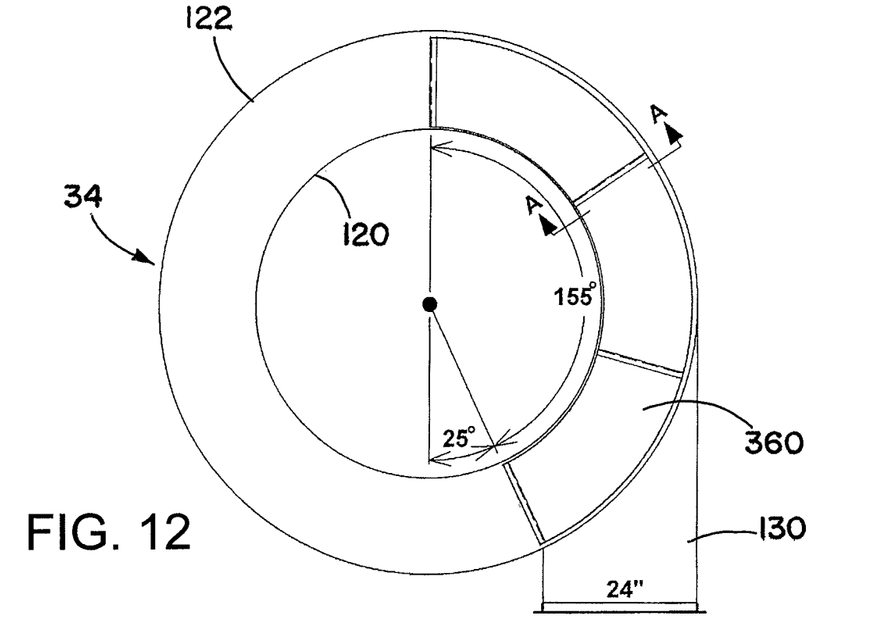
FIG. 12 is a top view of the swirl chamber with a top portion removed showing a baffle at a bottom of the swirl chamber.

Turning now to FIG. 12, a baffle 360 is provided that is interposed between the swirl chamber 34 and the bottom chamber 36. The baffle 360 at least spans a width of the inlet 36 to prevent fluid and particulates received at the inlet from exiting the swirl chamber 34 prior to being wetted by the nozzles 100-114. In an embodiment, the baffle 360 extends beyond the bottom of the inlet 36 to a point at least ninety degrees from an upstream most point of the inlet 36. In another embodiment, the baffle extends beyond the bottom of the inlet 36 to a point at least one hundred fifty-five degrees from an upstream most point of the inlet 36.

Figure 13:
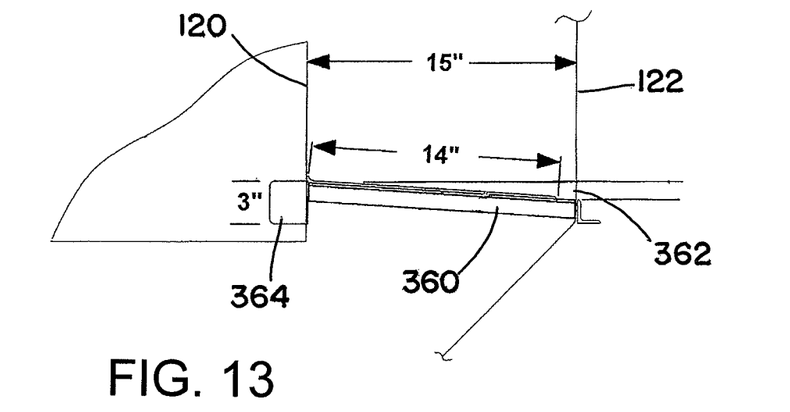
FIG. 13 is a cross-sectional view of the swirl chamber taken about line A-A in FIG. 12.

Referring now to FIG. 13, a cross-sectional view of the swirl chamber 34 shows the baffle 360 downwardly angled from the inner circumferential wall 120 to the outer circumferential wall 122 to allow fluid and particulates to flow towards the outer circumferential wall 122, for example to prevent buildup up fluid and particulates in the chamber. A gap 362 is provided between the outer circumferential wall and the baffle 360 to allow the fluid and particulates to flow to the outlet 38 of the swirl chamber 34 and into the bottom chamber 36. A stiffener plate 364 may be provided at the inner circumferential wall 120 to provide extra support to an end of the baffle 360 coupled to the inner circumferential wall 120.

During operation, dust laden air from the conversion line 10 is delivered by the blower 20 to the inlet portion 130 of the wet cyclone dust collector 18, where nozzles 116 and 118 partially wet the dust laden air as it is blown into the swirl chamber 34. The dust laden air continues to flow into the swirl chamber 34 where it swirls in the first rotational direction 124. As the dust laden air swirls in the swirl chamber 34, the nozzles 100, 102, 104, 106, 108, 110, 112 and 114 direct a spray of fluid through the swirl chamber that impinges on the inner surface of the outer circumferential wall 122 and the outer surface of the inner circumferential wall 120 to wet the dust. The wetted dust swirls in the swirl chamber 34 and is centrifugally separated from the air by forces in the chamber 34 and by interaction with the inner circumferential wall 120. The separated air can then flow under the inner circumferential wall 120 and flow upward out the center of the wet cyclone dust collector 18 through the exhaust 40. As the air passes through the exhaust 40, the air may optionally pass through a screen, such as a stainless steel screen formed at a forty-five degree angle to capture excess moisture in the air. The captured moisture may drain back into the swirl chamber 34, for example by flowing down the top circumferential wall 126 which may be conical, as shown by broken lines in FIG. 2.

As the wetted dust swirls in the swirl chamber 34, the dust is centrifugally funneled downward, exits the swirl chamber via the outlet 38, and flows into the bottom chamber 36. The wetted dust exits the bottom chamber 36 at outlet 64 and enters the collection tank 60 at inlet 62. As the wetted dust moves down the collection tank 60, the dust is at least partially separated from the fluid, and substantially clean fluid exits the collection tank 60 via the first outlet 66 and is delivered to the swirl chamber 34 by the pump 68. The remaining wetted dust exits the collection tank 60 via the second outlet 70 connected to a suitable filtration system for filtering the dust from the fluid and for delivering the filtered fluid to the swirl chamber 34 and/or to a drain. The dry dust in the filtration system may then be disposed of, for example in a landfill. Accordingly, an economical dust collection and disposal system may be provided that uses minimal floor space in a plant, reduces energy used as compared to systems requiring additional fans, motors, and compressed air, eliminates explosion risk and explosion venting requirements, and applies minimal back pressure to the conversion lines vacuum blower. It will also be appreciated that multiple wet cyclone dust collectors 18 may provided.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cardboard conversion line including:
an entry end for receiving cardboard to be subsequently processed as it passes through one or more processing stations within the conversion line;
at least one collection zone through which the cardboard passes;
a wet cyclone dust collector; and
a blower having an inlet connected to the at least one collection zone and an outlet connected to an inlet of the wet cyclone dust collector,
wherein the wet cyclone dust collector includes:
a swirl chamber defined by an inner circumferential wall and an outer circumferential wall radially spaced from the inner wall, the swirl chamber including an inlet tangential to the inner and outer circumferential walls for directing air containing particulates into the swirl chamber causing the air to swirl in a first rotational direction, and an outlet at a bottom of the swirl chamber; and
a plurality of circumferentially spaced nozzles located within the swirl chamber to direct a spray of fluid within the swirl chamber in the first rotational direction, the plurality of circumferentially spaced nozzles including at least one nozzle in each quadrant of the swirl chamber.

2. The cardboard conversion line according to claim 1, wherein the plurality of circumferentially spaced nozzles are spaced apart such that the spray exiting each of the nozzles intersects the nozzle downstream of the respective nozzle.

3. The cardboard conversion line according to claim 1, wherein the plurality of circumferentially spaced nozzles collectively generate a spray of fluid that impinges on an inner surface of the outer circumferential wall over at least 70% of the inner surface to remove particulates from the inner surface.

4. The cardboard conversion line according to claim 1, further including an inlet portion connected to the inlet of the swirl chamber, the inlet portion having at least one nozzle within the inlet portion to direct a spray of fluid in the first rotational direction.

5. The cardboard conversion line according to claim 1, further including a conical bottom chamber disposed beneath the swirl chamber and having an inlet adjacent the outlet of the swirl chamber for receiving the swirling fluid and particulates and an outlet.

6. The cardboard conversion line according to claim 5, further including a baffle interposed between the swirl chamber and the bottom chamber, the baffle at least spanning a bottom of the inlet of the swirl chamber to prevent fluid and particulates received at the inlet from exiting the swirl chamber prior to being wetted by the nozzles.

7. The cardboard conversion line according to claim 6, wherein the baffle extends beyond the bottom of the inlet to a point at least ninety degrees from the inlet.

8. The cardboard conversion line according to claim 6, wherein the baffle is downwardly angled from the inner circumferential wall to the outer circumferential wall to allow fluid and particulates to flow towards the outer circumferential wall.

9. The cardboard conversion line according to claim 6, wherein a gap is provided between the outer circumferential wall and the baffle to allow the fluid and particulates to flow to the outlet.

10. The cardboard conversion line according to claim 1, wherein the swirl chamber includes a central axis, and wherein the plurality of circumferentially spaced nozzles each have an axis oriented fifteen degrees relative to a plane parallel to and intersecting the axis of the swirl chamber.

11. The wet cyclone dust collector according to claim 1, further including an inlet portion connected to the inlet of the swirl chamber, the inlet portion having at least one nozzle within the inlet portion to direct a spray of fluid in the first rotational direction.

12. The cyclone dust collector according to claim 1, further including a conical bottom chamber having an inlet adjacent the outlet of the swirl chamber for receiving the swirling fluid and particulates and an outlet.

13. A wet cyclone dust collector including:
a swirl chamber defined by an inner circumferential wall and an outer circumferential wall radially spaced from the inner wall, the swirl chamber including a central axis, an inlet tangential to the inner and outer circumferential walls for receiving particulates, and an outlet at a bottom of the swirl chamber;
a plurality of circumferentially spaced nozzles spaced inwardly from the outer circumferential wall and having an axis and being located within the swirl chamber to direct a spray of fluid within the swirl chamber, wherein the axis of each nozzle is oriented fifteen degrees relative to a plane parallel to and intersecting the axis of the swirl chamber and the nozzle.

14. A wet cyclone dust collector including:
a swirl chamber defined by an inner circumferential wall and an outer circumferential wall radially spaced from the inner wall, the swirl chamber including an inlet tangential to the inner and outer circumferential walls, and an outlet at a bottom of the swirl chamber;
a plurality of nozzles located within the swirl chamber to direct a spray of fluid within the swirl chamber;
a bottom chamber disposed beneath the swirl chamber and having an inlet adjacent the outlet of the swirl chamber for receiving swirling fluid and particulates from the swirl chamber; and
a baffle interposed between the swirl chamber and the bottom chamber, the baffle at least spanning a bottom of the inlet to prevent fluid and particulates received at the inlet from exiting the swirl chamber prior to being wetted by the nozzles.

15. The wet cyclone dust collector according to claim 14, wherein the baffle extends beyond the bottom of the inlet to a point at least ninety degrees from the inlet.

16. A method of wetting dust collected from a cardboard conversion line using a wet cyclone dust collector including a swirl chamber defined by an inner circumferential wall and an outer circumferential wall radially spaced from the inner wall, and a plurality of nozzles located within the swirl chamber, wherein the plurality of nozzles intersect such that a spray of fluid directed from the nozzles impinges on an interior surface of the outer circumferential wall over at least 70% of the inner surface to remove cardboard particulates from the inner surface.

17. The method according to claim 16, wherein the plurality of nozzles collectively generate a spray of fluid that impinges on an inner surface of the outer circumferential wall over at least 80% of the inner surface to remove cardboard particulates from the inner surface.

18. A system for collecting particles, the system including:
a conversion line having an entry portion for receiving material to be subsequently processed as it passes through one or more processing stations within the conversion line, and at least one collection zone through which the material passes;
a cyclone particulate collector; and
a blower having an inlet connected to the at least one collection zone and an outlet connected to an inlet of the cyclone particulate collector,
wherein the cyclone particulate collector includes:
a swirl chamber including an inlet for directing air containing particulates into the swirl chamber causing the air to swirl in a first rotational direction, and an outlet at a bottom of the swirl chamber; and
a plurality of circumferentially spaced nozzles located within the swirl chamber to direct a spray of fluid within the swirl chamber in the first rotational direction.

19. The system according to claim 18, further including a conical bottom chamber disposed beneath the swirl chamber and having an inlet adjacent the outlet of the swirl chamber for receiving the swirling fluid and particulates, and an outlet collection tank downstream of the conical bottom chamber, wherein the fluid and particulates are delivered to the collection tank where the fluid and particulates are at least partially separated.

20. The system according to claim 19, further including a baffle interposed between the swirl chamber and the bottom chamber, the baffle at least spanning a bottom of the inlet of the swirl chamber to prevent fluid and particulates received at the inlet from exiting the swirl chamber prior to being wetted by the nozzles.

* * * * *